April 30, 1968    A. D. GOETTL ETAL    3,380,752
UTILITY CART
Filed July 1, 1966    2 Sheets-Sheet 1
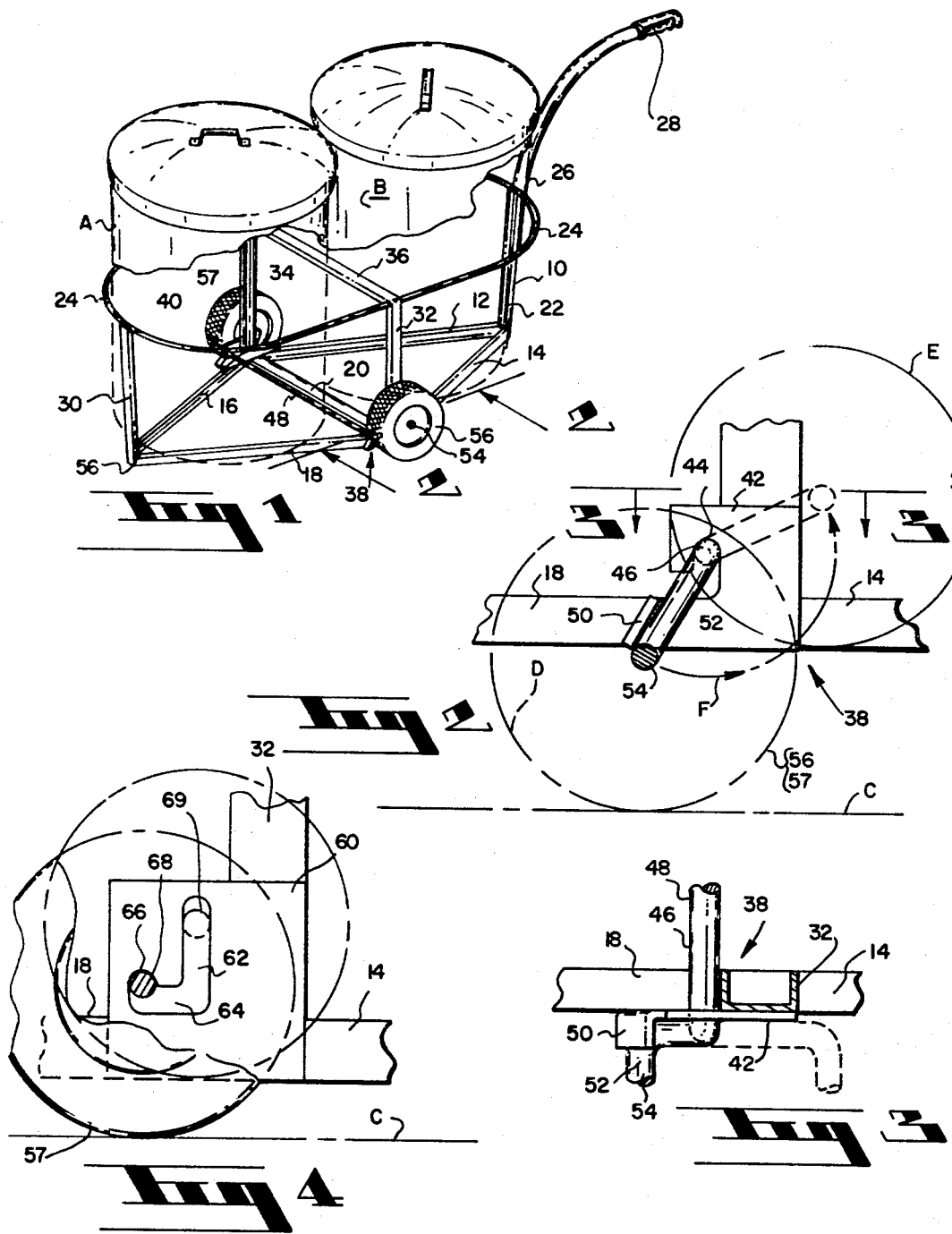
INVENTOR.
ADAM D. GOETTL
JOHN GOETTL
BY
Wm. H. Dean April 30, 1968     A. D. GOETTL ET AL     3,380,752
UTILITY CART
Filed July 1, 1966     2 Sheets—Sheet 2
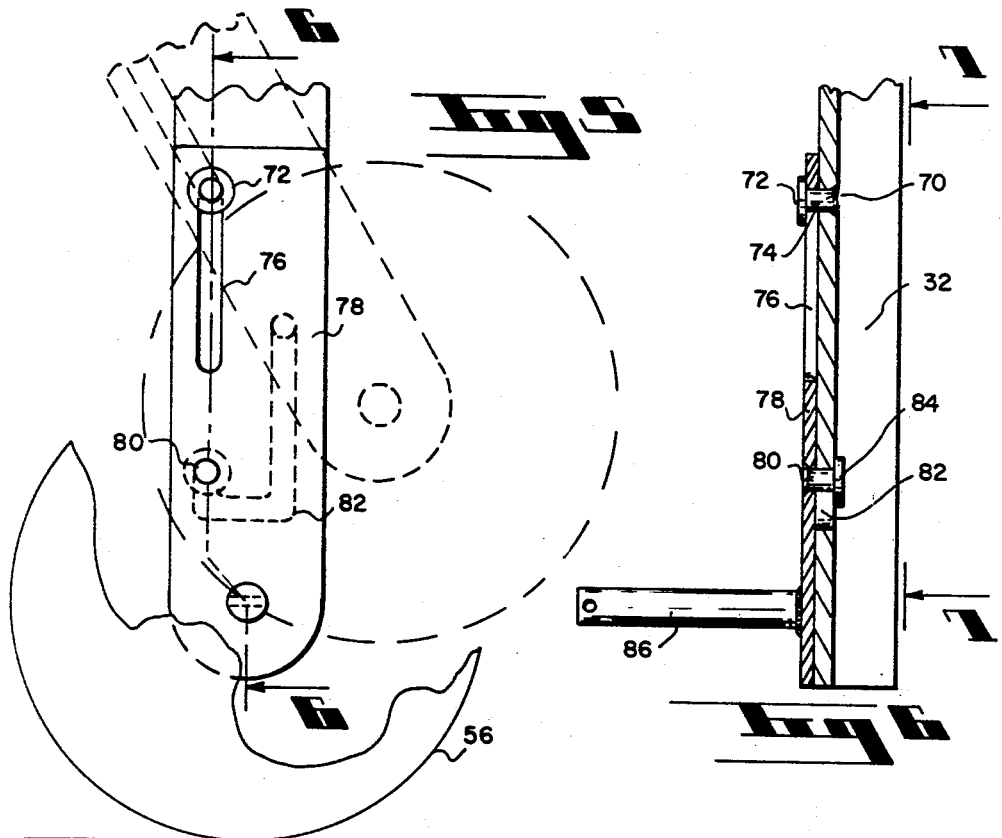
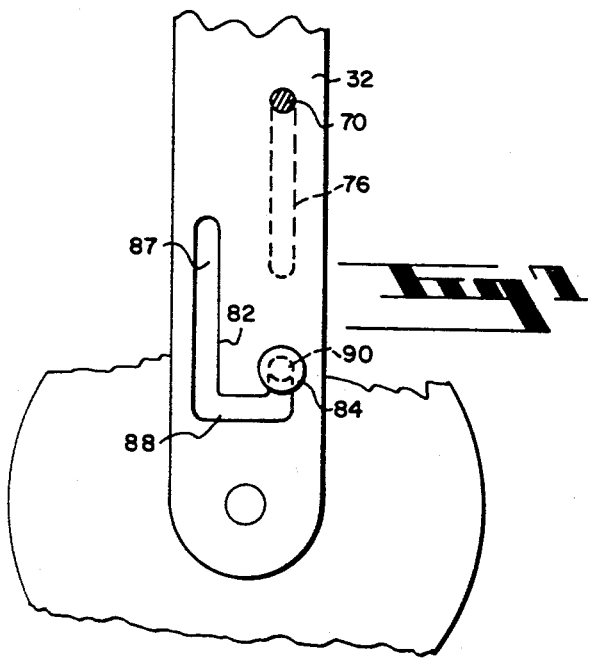
INVENTOR.
ADAM D. GOETTL
BY JOHN GOETTL

United States Patent Office 3,380,752
Patented Apr. 30, 1968

---

3,380,752
UTILITY CART
Adam D. Goetti, 4960 E. Palomino Road, and John Goetti, 3229 E. Mitchell Drive, both of Phoenix, Ariz. 85018
Filed July 1, 1966, Ser. No. 562,279
1 Claim. (Cl. 280—43)

ABSTRACT OF THE DISCLOSURE

A utility cart adapted for movement on a pair of wheels, and having wheel mounting structures adapted for vertical sliding movement relative to the frame of the vehicle, and also for pivotal movement about a horizontal axis so that the vehicle may be selectively supported on the wheels or the frame thereof may be readily dropped to the ground for stable disposition thereon, as desired.

---

This invention relates to a utility cart, and more particularly, to a utility cart for support and transporting trash cans, or the like.

Prior art utility carts have been used for various purposes, including the transport and holding of trash or garbage cans, however, most conventional carts employ wheel brakes or ground engaging brakes for retaining such carts in stationary position and desired locations. Additionally, conventional utility carts portably mounted on only two wheels tend to tilt and be vertically unstable, when disposed in stationary positions, and particularly when utilized to support trash cans, or the like, which may be intermittently loaded with disposable waste material.

Additionally, many utility carts are so arranged, that part of the load carried on the cart must be carried by the operator by means of the conventional cart handle.

Accordingly, it is an object of the present invention to provide a very simple and economical utility cart having very simple means for extending or retracting the wheels of the cart vertically so as to permit the bottom of the cart to rest securely on the ground or to be transported on the wheels, when the wheels are extended downwardly into an operative position with relation to the cart frame.

Another object of the invention is to provide a very novel utility cart having upwardly retractable and downwardly extendable wheels in relation to the frame of the cart and wherein the frame is provided with means forward and rearward of the wheel axes to support trash cans or other receptacles in order to balance the load of the cart over the axes of the wheels, whereby when the cart frame is lowered to the ground, it is very stable when in stationary position and when the wheels are extended downwardly and the cart is carried on the wheels, the load is sufficiently balanced over the wheel axes.

Another object of the invention is to provide a novel wheel lowering and retracting mechanism adapted to lower and retract wheels relative to the cart frame by a simple upward tilting movement of the frame and concurrent movement laterally of the axes of the wheels, while they are permitted frictionally to engage the ground.

Another object of the invention is to provide a novel mechanism which is very simple and economical to construct and operate; said mechanism being adapted for mounting a pair of cart supporting wheels relative to the frame thereof in upwardly retractable or downwardly extendable position so as to permit the cart frame to rest directly on the ground or to be transported by rolling support of the wheels of the cart.

Further objects and advantages of the invention may be apparent from the following specification, appended claims and accompanying drawings, in which:

FIG. 1 is a perspective view of a utility cart in accordance with the present invention and showing fragmentarily portions of trash cans supported on the cart and showing the wheels of the cart retracted upwardly so that the bottom of the cart frame may rest on the ground and provide a stable support for the cans during the intermittent loading thereof;

FIG. 2 is an enlarged sectional view taken from the line 2—2 of FIG. 1, showing by broken lines, a varying position of the cart wheel axle extending and retracting mechanism for extending the wheels downwardly relative to the frame for rolling support thereof and for retracting the wheels upwardly so as to permit the lower surface of the frame to rest on the ground;

FIG. 3 is a plan sectional view taken from the line 3—3 of FIG. 2;

FIG. 4 is a view similar to FIG. 2, but showing a modification of the invention;

FIG. 5 is another view similar to FIG. 2, but showing a further modification of the invention;

FIG. 6 is a sectional view taken from the line 6—6 of FIG. 5; and

FIG. 7 is a fragmentary elevational view taken from the line 7—7 of FIG. 6.

As shown in FIG. 1 of the drawings, the utility cart of the present invention is provided with a frame 10 having base frame members 12, 14, 16, 18 and 20. These frame members are disposed in substantially a horizontal plane and are all adapted to rest on the ground as will be hereinafter described in detail.

The frame members 12 and 14 are interconnected at their ends adjacent the middle of the cart frame by the member 20. The opposite ends of the members 12 and 14 are connected to a vertical frame member 22 which extends upward into connection with a trash can surrounding railing 24. Also, connected to the upright frame member 22 is a handle member 26 which extends upwardly and laterally to a grip portion 28 thereon manually engageable by a hand of a human operator.

Secured to opposite ends of the base frame member 20 are ends of the base frame members 16 and 18 and opposite ends of these members 16 and 18 are secured to an upright frame member 30 which, at its upper end, is connected to the surrounding railing 24.

Secured to opposite ends of the transverse base frame member 20 are uprights 32 and 34 having their upper ends connected to the surrounding railing 24 and also connected to a cross member 36 disposed at substantially a common plane with the surrounding railing 24. The cross member 36 serving to brace the railing 24 in a lateral direction and also to act as a separator for a pair of trash cans, designated A and B. The lower ends of these trash cans A and B rest on the cross members 16 and 18, respectively, and the cross members 12 and 14, respectively.

As shown in FIGS. 2 and 3 of the drawings, mechanism is connected to the upright frame member 32 at its juncture with the horizontal base frame members 14 and 18. It will be appreciated that this mechanism, designated generally at 38, is disposed on the one side of the frame and a duplicate opposite hand mechanism 40 is disposed on the opposite side of the frame at the juncture of the vertical frame member 34 and the horizontal base frame members 12 and 16.

Accordingly, the mechanism shown in FIGS. 2 and 3 and designated generally 38, will be hereinafter described.

The mechanism 38 comprises a plate 42 having an axle retaining notch 44 in which a horizontally disposed portion 46 of a wheel axle structure 48 is pivotally mounted. The plate 42 is provided with an angularly and outwardly directed portion 50 serving as an over center stop portion engageable by a bell crank portion 52 of the axle structure 48. It will be appreciated that the axle structure 48 at opposite sides of the cart is provided with a bell crank portion similar to the bell crank portion 52 and that a portion 54 of each bell crank portion 52 serves as a wheel axle. This portion 54 extends outwardly away as the frame and rotatably mounted thereon is a ground engaging wheel 56, as shown in FIG. 1 of the drawings.

The axle structure 48 at its opposite ends is integral with the bell crank structures and its intermediate portion 46 extends horizontally across the frame parallel to the base frame member 20.

The stop portion 50 is located forwardly of the pivotal axis provided by the notch portions 44 in the plate 42 so that a plane passing through the axle portion 46 is substantially rearward of the wheel axle portions 54. Thus, with the weight of the cart on the frame thereof, the bell crank portion 52 is held firmly forward and upward against the stop portion 50 so that the frame of the utility cart of the invention may be rolled upon the wheels 56 and 57 and, thus, the axle mechanism, shown in FIGS. 2 and 3 of the drawings, is disposed in its downward extended position for holding the wheels downward and to support the frame of the utility cart of the invention well above the surface of the ground C, shown in FIG. 2 of the drawings.

When it is desired to pivot the wheels from a downward position, as indicated by the broken lines D, to an upward position indicated by broken lines E, in FIG. 2 of the drawings. A forward corner 56 of the frame 10, as shown in FIG. 1, is tiltably engaged with the ground and the handle 28 is raised up so that the wheels 56 and 57 tend gravitationally to pivot down into a position directly below the pivot portions 44 of the plates 42. The cart is then slidably moved forward a short distance with the wheels 56 and 57 engaging the ground, which tends to pivot the axles 54 backwardly in a direction, as indicated by an arrow F in FIG. 2 of the drawings, whereupon the axles 54 pass over center rearwardly of a plane vertically disposed downward through the pivots 44, whereupon the lowering of the handle 28 permits the horizontal base frame members 12, 14, 16 and 18 to be directly lowered to the surface of the ground, while the wheels 56 and 57 are pivoted upwardly to the position E and during which time their peripheries still rest on the ground on a common plane with the bottom of the base frame members 12, 14, 16 and 18.

In this position, the cart is very stable and permits intermittent loading of the trash cans A and B until such time as they are filled and ready to be transported to a position in which they are relieved of their contents. In many instances, such position may include the edge of a roadway or street along which garbage collection trucks travel. During the time that the cart is awaiting emptying of the trash cans A and B, it may rest on the bottom of the frame, as hereinbefore described.

When it is desired to transport the cart on the wheels 56 and 57, these wheels may be moved downward into extended position, simply by raising the handle 28 until the wheels 56 and 57 swing to a position in which their axles 54 are in a plane vertically below the pivots 44, then the handle 28 is pulled backward slightly, forcing the axes of the wheels 56 and 57, when in contact with the ground, forward in a direction opposite to the direction of the arrow F, until the bell crank portions 52 contact the stop 50, whereupon the frame may be then tilted into horizontal position and the wheel axles 54 are in an oven center position firmly engaged with the stops 50 and forward of the plane passing downwardly vertically through the pivots 44. When on the wheels 56 and 57, in this manner, the handle 28 may be used to guide the cart and to motivate it by manual force and the cans A and B disposed at opposite sides of the axes of the axles 54 tend to balance the load on the frame so that very little effort is necessary for the transport of heavily laden cans, when a person manually operates the handle 28.

In the modification of the wheel retracting and extending mechanism, shown in FIG. 4, plates 60 are connected to the base frame members and uprights in a similar manner to the connection of the plates 42, hereinbefore described. The plates 60 are disposed at opposite sides of the cart frame and accordingly, only the plate 60 connected to the horizontal base frame members 14 and 18 and the upright 32 will be hereinafter described.

The plate 60, shown in FIG. 4, is substantially L-shaped having a vertical slot portion 62, a horizontal slot portion 64 and an upwardly extending notch portion 56 extending vertically upward beyond the confines of the slotted portion 64, but communicating therewith.

In this modification, a straight axle 68 is utilized and extends directly through the wheels 56 and 57 and forms the structure about which the wheels rotate and consequently, the entire axle is straight and in alignment with the axes of the wheels 56 and 57. The axle, as shown in FIG. 4, extends through the slots 66 and when the cart frame is raised up slightly and moved slightly forward, the axle 68 drops downward out of the notches 66 and is moved backwardly through the slotted portion 64 until it reaches the slotted portion 62 whereupon lowering of the frame permits the bottom of the frame to move downward into a rest position on the ground and the relative position of the axle 68 is indicated by broken lines 69 in FIG. 4 of the drawings. This L-shaped slotted structure is a very simple means by which the wheels may be extended or retracted for carrying the cart frame on the wheels or for retracting the wheels so that the bottom of the cart frame may rest on the ground.

When it is desired to extend the wheels, in the modification as shown in FIG. 4, the frame is simply raised and moved backward so that the axle drops in the position 69 to the level of the slotted portion 64 and as the frame is moved backward with the wheels touching the ground, the axle is moved relative to the slots 64, such that it reaches a position directly below the notch portion 66, whereupon lowering of the frame, the axle 68 is captured in the notches 66 and the frame may thus be carried on the axle with the wheels rotatably operating on the ground and holding the frame thereabove.

In the modified structure, as shown in FIGS. 5, 6 and 7, the wheel retracting and extending mechanism is shown connected to the vertical frame member 32 and a similar mechanism is connected to the vertical frame member 34.

Fixed to the vertical frame member 32 is a pin 70 which extends outwardly to a headed portion 72 thereof, the shank 74 of the pin passes through a slot 76 in an axle support plate 78. The slot 76 is vertically elongated and secured to the axle supporting plate 78 is a pin 80 which passes through an L-shaped slot 82 in the frame member 32 and the pin 80 is provided with a headed portion 84 overlying the opposite edges of the slot 82, as will be hereinafter described.

Carried by the plate 78 is an axle 86 about which the wheels 56 may be rotatably mounted.

The L-shaped slot 82 in the frame members 32 is similar to the L-shaped slot in the mechanism, shown in FIG. 4 of the drawings, this L-shaped slot is provided with a vertical slotted portion 87, a horizontally slotted portion 88 communicating therewith and an upwardly directed notch portion 90 similar to the notch portion 66, hereinbefore described.

In operation, the entire plate 78 moves upwardly and downwardly, guided by the pin 70 while the slotted portion 76 traverses it, the pin 70 being stationary on the frame member 32, the slotted notch portion 90 engaging the pin 80 and when the pin is moved downwardly out of the notch portion 90 and slightly through the notch portion 88 and upwardly in the slotted portion 87, the plate 78 moves upward and the slotted portion 76 traverses the pin 70 so that the wheels 56 may move from the solid position, shown in FIG. 5, to the broken line position, shown therein, and thus being similar to the extended and retracted positions of the wheels, as shown in FIGS. 2 and 4, and as hereinbefore described.

It will be obvious to those skilled in the art that various modifications of the present invention may be resorted to in a manner limited only by a just interpretation of the following claim.

We claim:

1. In a utility cart the combination of: a frame; wheel axle means freely movably mounted on said frame in response to gravity and laterally relative to the axis of said wheel axle means; wheels rotatably mounted on said axle means and adapted to roll on the ground and to support said frame; second means on said frame for supporting said wheel axle means in an upper position so as to permit upward retraction of said wheels and to permit said frame to rest on the ground, said second means also adapted to support said axle means in a relatively lower position on said frame, such that said wheels support said frame in a position above the ground; said second means having stop means for holding said axle in said lower position against upward vertical movement on said frame, said second means having relief means disposed to permit said wheel axle means to drop downwardly from said stop means and to permit said axle means to move laterally away from said stop means and then upwardly to said upper position relative to said frame, when said frame is successively raised, then moved laterally of said wheel axis, while said wheels touch the ground, and then lowered by gravity to rest said frame on the ground; said second means comprises wheel axle mounting plates; further means mounting said plates for vertical sliding movement and pivotal movement on said frame, said further means comprising L-shaped slotted structures; pins relatively movably mounted in said L-shaped slotted structures for movably supporting said mounting plates relative to said frame and for controlling disposition of said wheels in said upper and lower positions.

References Cited
UNITED STATES PATENTS

| | | | |
|---|---|---|---|
| 736,697 | 8/1903 | Cummins | 280—43 X |
| 1,084,930 | 1/1914 | Eckelberg | 280—43 X |
| 1,137,993 | 5/1915 | McCarthy | 280—43 X |
| 3,130,979 | 4/1964 | Valiquette | 280—43 |

FOREIGN PATENTS

| | | |
|---|---|---|
| 921,660 | 5/1947 | France. |
| 142,053 | 9/1953 | Sweden. |

BENJAMIN HERSH, *Primary Examiner.*

C. C. PARSONS, *Assistant Examiner.*